United States Patent [19]

Ballachino et al.

[11] Patent Number: 5,710,939
[45] Date of Patent: Jan. 20, 1998

[54] BIDIRECTIONAL PARALLEL DATA PORT HAVING MULTIPLE DATA TRANSFER RATES, MASTER, AND SLAVE OPERATION MODES, AND SELECTIVE DATA TRANSFER TERMINATION

[75] Inventors: William Ballachino, Arlington, Tex.; James Andrew Colgan, Ichikawa, Japan; Franco Iacobelli, Sunnyvale, Calif.

[73] Assignee: National Semiconductor Corporation, Santa Clara, Calif.

[21] Appl. No.: 452,350

[22] Filed: May 26, 1995

[51] Int. Cl.⁶ .................................................. G06F 13/00
[52] U.S. Cl. ....................... 395/821; 395/851; 395/852; 395/849
[58] Field of Search .............................. 395/375, 250, 395/821, 851, 852, 849; 371/69.1

[56] References Cited

U.S. PATENT DOCUMENTS

| | | | |
|---|---|---|---|
| 3,975,712 | 8/1976 | Hepworth et al. | 340/147 R |
| 4,644,547 | 2/1987 | Vercellotti et al. | 371/69 |
| 4,933,838 | 6/1990 | Elrod | 364/200 |
| 5,097,410 | 3/1992 | Hester et al. | 395/275 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,280,584 | 1/1994 | Caesar et al. | 395/250 |
| 5,301,275 | 4/1994 | Vanbuskirk et al. | 395/250 |
| 5,335,329 | 8/1994 | Cox et al. | 395/325 |
| 5,404,452 | 4/1995 | Detschel et al. | 395/250 |
| 5,404,473 | 4/1995 | Papworth et al. | 395/375 |
| 5,408,626 | 4/1995 | Dixit | 395/400 |
| 5,471,638 | 11/1995 | Keeley | 395/800 |
| 5,481,736 | 1/1996 | Schwartz et al. | 395/800 |
| 5,502,826 | 3/1996 | Vassiliadis et al. | 395/375 |

FOREIGN PATENT DOCUMENTS

| | | |
|---|---|---|
| 0367284 | 5/1990 | European Pat. Off. |
| 94/18619 | 8/1994 | WIPO |

OTHER PUBLICATIONS

Serra, Micaela & Dervisoglu, Bulent I., "Testing", Chapter 79, *The Electrical Engineering Handbook*, Richard C. Dorf, Editor-in-Chief, pp. 1808–1837, CRC Press.

L-T Wang et al., "Feedback Shift Registers For Self-Testing Circuits", *VLSI Systems Dsign*, Dec. 1986.

Masakazu Shoji, "CMOS Dynamic Gates", Chapter 5, *AT&T CMOS Digital Circuit Technology*, Prentice Hall, 1988, pp.210–257.

(List continued on next page.)

*Primary Examiner*—Thomas C. Lee
*Assistant Examiner*—Duo Chen
*Attorney, Agent, or Firm*—Limbach & Limbach L.L.P.

[57] ABSTRACT

A bidirectional parallel signal interface for providing a parallel data interface between a computer and an external peripheral device includes an interface circuit with command registers for communicating commands and data, a first-in, first-out (FIFO) memory for communicating data between the computer and the peripheral device, and host and slave state machines for receiving commands from the command registers and in accordance therewith controlling communication of data between the FIFO and peripheral device and communicating control signals to and from the peripheral device. The communication of data between the FIFO and peripheral device is effected in accordance with data communication rates which are controlled by the host and slave state machines in accordance with the commands from the command registers. The communications of control signals by the host and slave state machines are responsive to their control signals with such responsiveness being controllable in accordance with the commands from the command registers. The communication of data from the FIFO to the peripheral device is halted by the host state machine in accordance with its commands from the command registers. The command registers include a status register for storing data from the peripheral device representing a number of status states of the peripheral device.

13 Claims, 4 Drawing Sheets

OTHER PUBLICATIONS

Guthrie, Charles, "Power–On Sequencing For Liquid Crystal Displays; Why, When And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, Vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

BIDIRECTIONAL PARALLEL DATA PORT HAVING MULTIPLE DATA TRANSFER RATES, MASTER, AND SLAVE OPERATION MODES, AND SELECTIVE DATA TRANSFER TERMINATION

BACKGROUND OF THE INVENTION

1. Field of the Invention

The present invention relates to bidirectional parallel signal interfaces, and in particular, to bidirectional parallel signal interfaces between a computer and an external peripheral device.

2. Description of the Related Art

A number of signal interfaces for use between a computer and an external peripheral device are well-known in the art. One such interface is a bidirectional parallel signal interface for personal computers for which an industry standard has been developed and adopted. Such standard is known as the IEEE Standard 1284, dated Dec. 2, 1994.

While the IEEE 1284 bidirectional parallel port standard is widely used in the industry, it nonetheless has a number of disadvantages, relating primarily to the controlling of the data transfer rate between the computer and the peripheral device, susceptibility of the interface to interference from noise, and selective interruption of ongoing data transfers. Accordingly, it would be desirable to have an improved bidirectional parallel signal interface to address such problems.

SUMMARY OF THE INVENTION

A bidirectional parallel signal interface in accordance with the present invention is for coupling to and providing a parallel data interface between a computer and a peripheral device external thereto, wherein the computer operates in a plurality of modes including host and slave modes where data is communicated between the computer and the peripheral device. Such a parallel signal interface includes an interface circuit, a storage circuit, a host mode controller and a slave mode controller. The interface circuit includes a plurality of registers and is for coupling to a computer and communicating thereto and therefrom a plurality of commands and a first plurality of data, wherein the plurality of registers are for receiving, storing and outputting the plurality of commands. The storage circuit is coupled to the interface circuit and is for coupling to a peripheral device and communicating thereto and therefrom second and third pluralities of data. The host mode controller is coupled to the interface circuit and the storage circuit and is for receiving a first portion of the plurality of commands outputted by the plurality of registers and in accordance therewith controlling the communication of the second plurality of data from the storage circuit to the peripheral device, and for coupling to the peripheral device and communicating thereto and therefrom a first plurality of control signals. The slave mode controller is coupled to the interface circuit and the storage circuit and is for receiving a second portion of the plurality of commands outputted by the plurality of registers and in accordance therewith controlling the communication of the third plurality of data from the peripheral device to the storage circuit, and for coupling to the peripheral device and communicating thereto and therefrom a second plurality of control signals.

In accordance with one embodiment of the present invention, the communication of the second and third pluralities of data between the storage circuit and the peripheral device is effected in accordance with first and second data communication rates, and the first and second data communication rates are controlled by the host and slave mode controllers in accordance with the plurality of commands from the plurality of registers.

In accordance with another embodiment of the present invention, the communication of the first plurality of control signals by the host mode controller is responsive to a first portion of the first plurality of control signals and the communication of the second plurality of control signals by the slave mode controller is responsive to a second portion of the second plurality of control signals, and the responsiveness of the host mode controller and the responsiveness of the slave mode controller are controllable in accordance with the first and second portions of the plurality of commands, respectively.

In accordance with still another embodiment of the present invention, the communication of the second plurality of data from the storage circuit to the peripheral device is halted by the host mode controller in accordance with the first portion of the plurality of commands.

These and other features and advantages of the present invention will be understood upon consideration of the following detailed description of the invention and the accompanying drawings.

DETAILED DESCRIPTION OF THE INVENTION

Figure 1A:
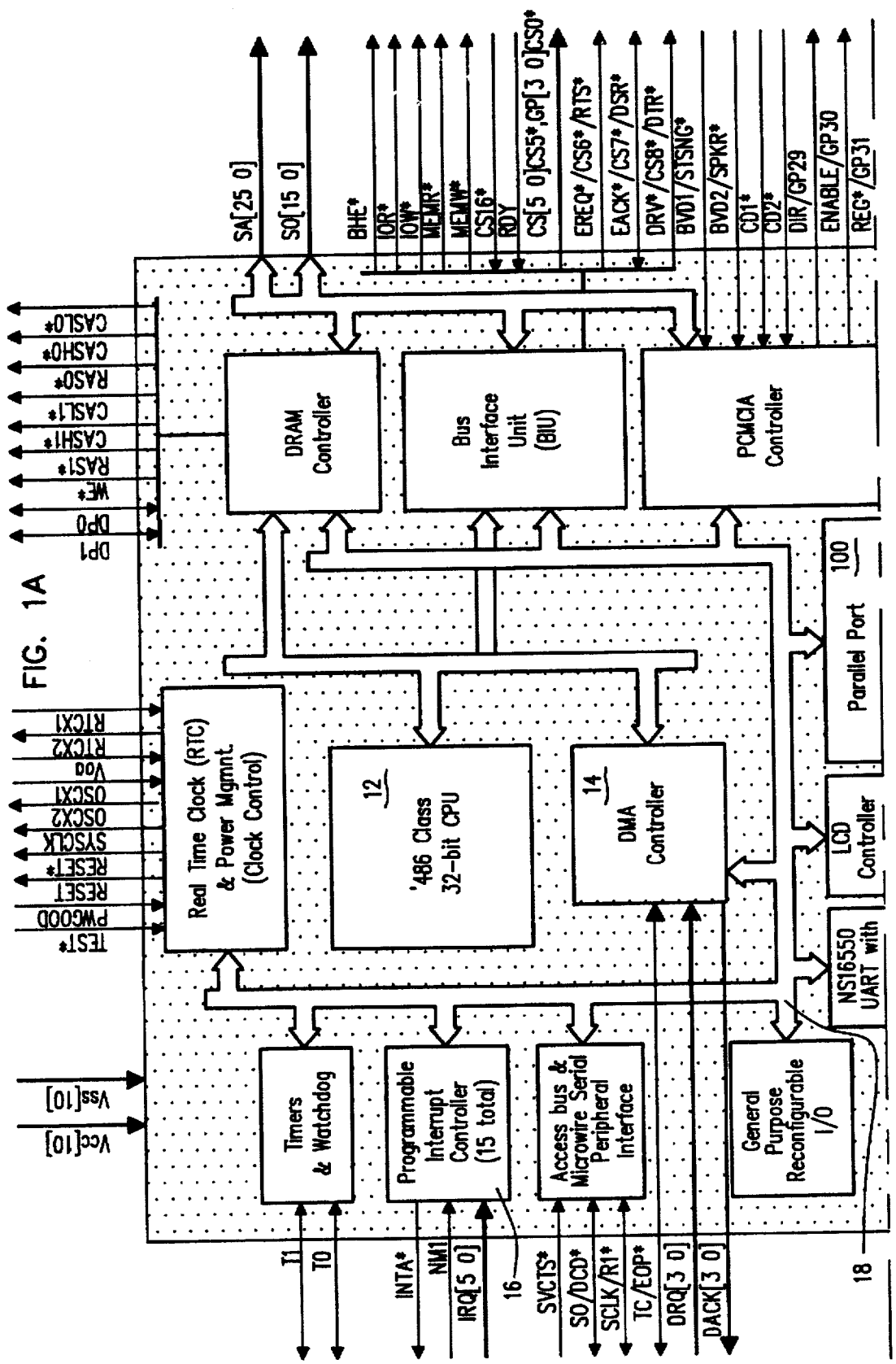
FIG. 1 is a functional block diagram of an integrated circuit (IC) suitable for use with and which embodies a bidirectional parallel signal interface in accordance with the present invention.
Figure 1B:
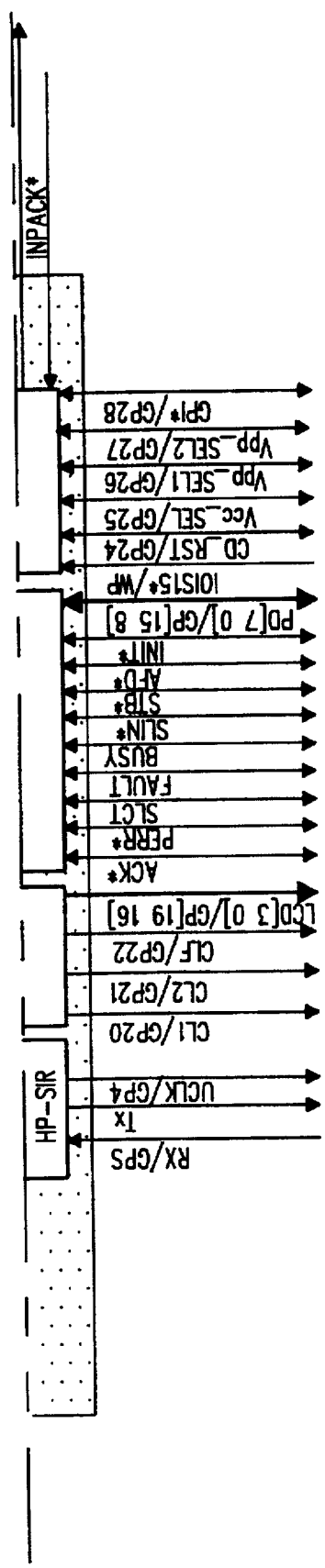
Figure 1B:
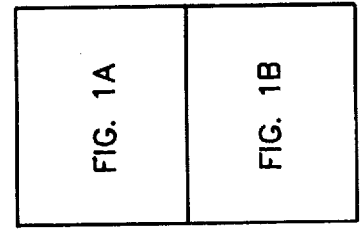

Referring to FIG. 1, an IC 10 in which a bidirectional parallel signal interface 100 in accordance with the present invention has been implemented includes a number of additional functions integrated therein, including a microprocessor (CPU) 12, a DMA controller 14 and a programmable interrupt controller 16, all of which communicate with the bidirectional parallel signal interface 100 over an internal peripheral bus 18. (Discussions regarding such other functions within the IC 10 of FIG. 1 can be found in the above-identified patent documents.)

Figure 2:
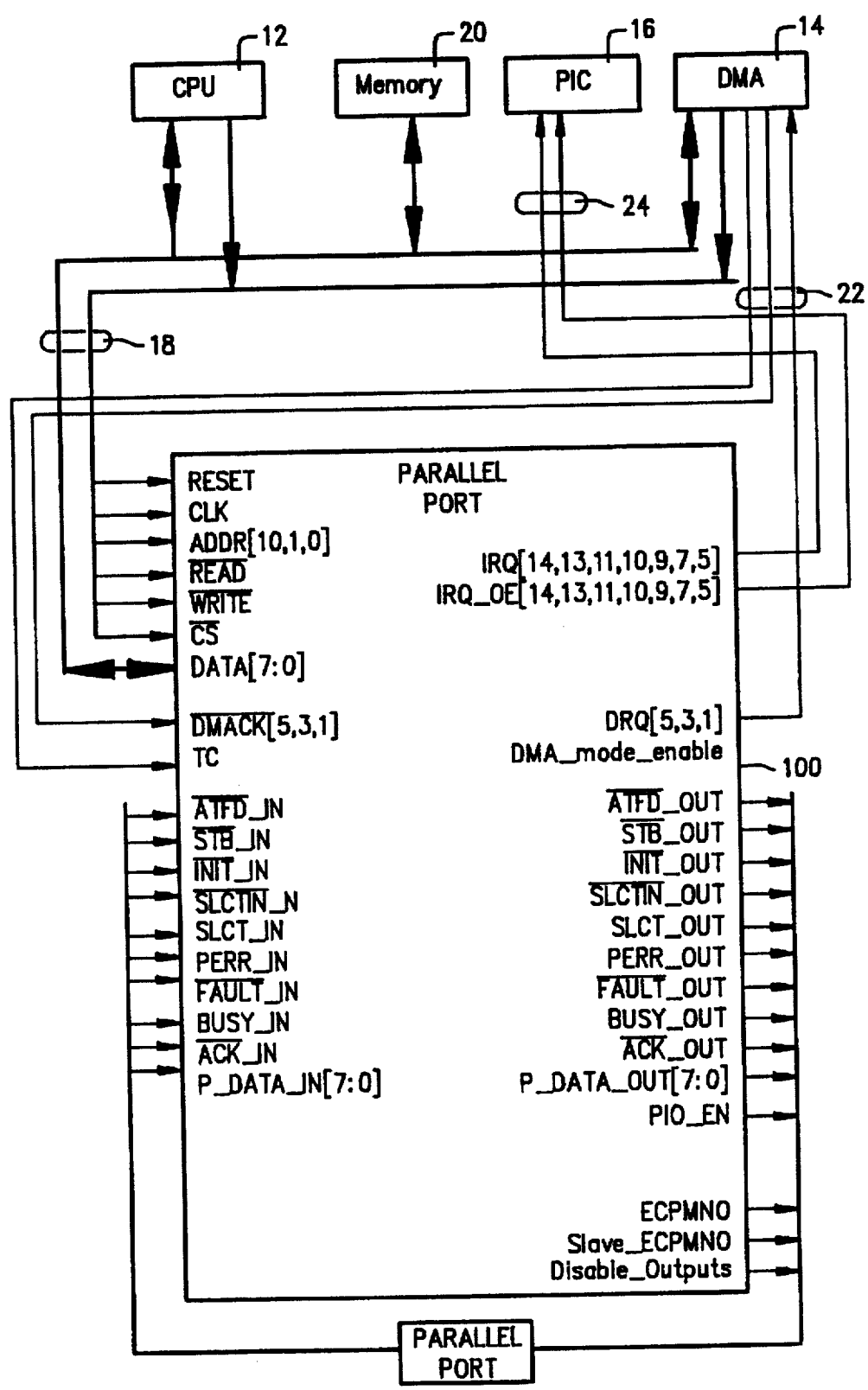
FIG. 2 is a functional block diagram identifying the input and output signals of the bidirectional parallel signal interface of FIG. 1 in accordance with one embodiment of the present invention and illustrates the interconnections of such signals within the IC of FIG. 1.

Referring to FIG. 2, the input and output signals of the bidirectional parallel signal interface 100 of FIG. 1 in accordance with one embodiment of the present invention provides exchanges signals (e.g. addresses, data, interrupts, etc.) over the internal peripheral bus 18 with the CPU 12, the DMA controller 14, the programmable interrupt controller 16 and some memory 20 resident within the IC 10. The bidirectional parallel signal interface 100 further exchanges some additional signals 22 with the DMA controller 14 and provides some interrupt signals 24 to the programmable interrupt controller 16.

Figure 3:
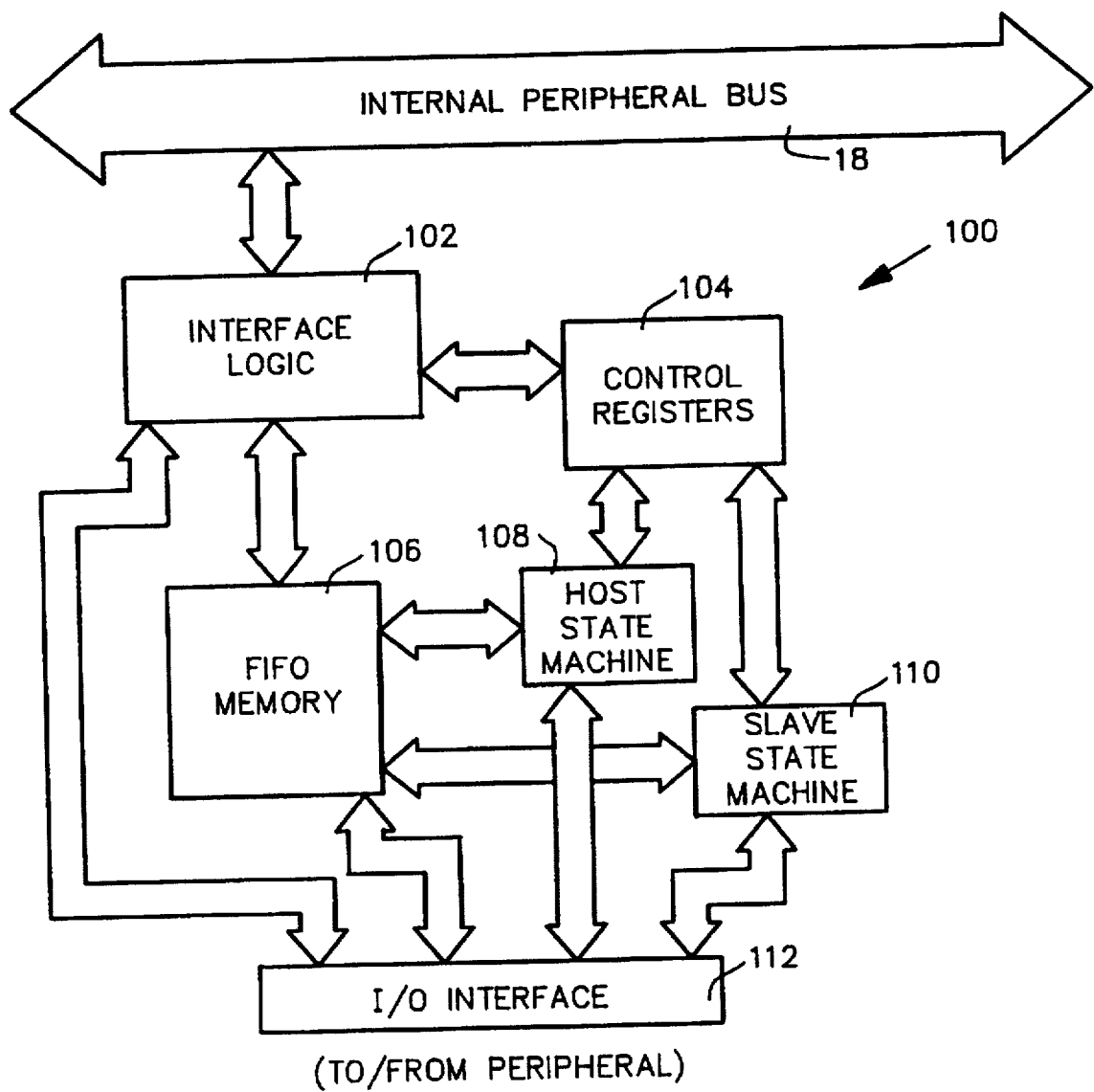
FIG. 3 is a functional block diagram of the bidirectional parallel signal interface of FIG. 2.

Referring to FIG. 3, the bidirectional parallel signal interface 100 of FIG. 2 includes some interface logic 102, a set 104 of control registers, a first-in, first-out (FIFO)

memory 106, a host state machine 108, a slave state machine 110 and an input/output interface 112 (e.g. an electrical connector in conformance with the aforementioned IEEE 1284 Standard), all of which cooperate to provide parallel data communications between the host CPU 12 (via the internal peripheral bus 18) and an external peripheral device (not shown). The commnnieations and interactions between these elements 102, 104, 106, 108, 110, 112 can be described as follows.

The bidirectional parallel signal interface 100 is a multi-function 8-bit parallel port that is compatible with the IEEE 1284 parallel port standard. The operation of the parallel port 100 is controlled by the content of the parallel port I/O control registers 104. The port 100 can operate in one of six modes: (1) a standard parallel port mode (Centrordcs compatible with a unidirectional data port); (2) a PS/2 compatible mode (same as compatible mode, but with bidirectional I/O lines); (3) a parallel port with FIFO mode that adds a FIFO and state machines for handling handshake signals; (4) the full Extended Capabilities Port (ECP) mode with state machines used for protocol and handshaking; (5) a configuration mode that permits access to special configuration registers that define the hardware implementation of interrupts (level vs. edge), and the steering of IRQ signals and the selection of DMA charmels (ECP and parallel port with FIFO modes only); and (6) a test mode that makes the contents of the internal FIFOs accessible via a TFIFO register bypassing normal FIFO fill/empty control cycles.

The performance of the port 100 is determined by the mode selected. The standard or Centrordcs compatible mode and the PS/2 mode support data transfers in the range of 60–150 kbytes/second. These are software limited modes where typically the CPU must respond to an interrupt on every data byte sent or received.

The parallel port with FIFO mode improves performance by limiting the interrupt to the CPU 12 to one every 8–16 bytes. Data is stored in the on-chip 16-byte FIFO memory 106 and handshake signals flag the CPU 12 only when the buffer 106 is full. In addition, a DMA access can be used to directly access the FIFO buffers 106, further reducing CPU 12 overhead.

The full ECP mode is also a high performance mode. It uses the internal FIFO memory 106 and state machine logic 108, 110 to enable the transfer of data using the DMA controller 14 for high speed data transfer rates, with minimum CPU 12 intervention. The ECP mode uses an asynchronous handshake, allowing devices to operate as fast or as slow as needed. The timing specification of the ECP mode is designed to allow a 2 Mbyte/second transfer rate over a 15-foot cable. A shorter cable will result in a higher bandwidth. A longer cable will slow down the transfer, but in a non-destructive manner. The parallel port 100 can support both Host and Slave modes making the parallel port 100 a versatile I/O controller.

The bidirectional parallel signal interface 100 can operate as an interface between a Host CPU 12 and a parallel port connector 112 as might be the case for a PC application (Host function). This port 100 can also operate as an interface between a parallel port connector 112 and a peripheral CPU as would be the case in a printer (Slave function). These two modes are referred to herein as Host mode and Slave mode.

The direction of transfer is referred to with respect to the flow of data across the parallel port cable. Forward direction refers to transfers where data flows from the Host to the Slave, while Reverse direction refers to transfers where data flows from the Slave to the Host. Notice that for the ECP port, both the Host-Forward direction and Slave-Reverse directions have the parallel port data pins driven by this block.

The ECP mode also implements a simple 128:1 data compression scheme. Single byte run length encoding (RLE) compresses strings of identical bytes. When a run-length count is received, the subsequent data byte is replicated the specified number of times. The ECP mode also supports a channel addressing scheme that provides for 128 channel addresses. Channel addresses can be changed dynamically.

The parallel port provides for 17 mandatory and two optional signal lines. The 17 mandatory signal lines can be divided into three sets: eight data, five status and four control. The data lines are written or read as a single I/O port (Data Register) as are the status lines (Device Status Register) and control lines (Device Control Register). Each register has a separate I/O address location accessed by a combination of a base I/O map address plus an offset value.

Because the parallel port has multiple functions, some setup and control registers have been added to the standard data, status and control registers (discussed in more detail below). These include five setup registers; the Extended Control Register (ECR) that sets the operating mode and controls interrupt and DMA operations; and two Configuration Registers that control the steering of IRQ and DMA signals. These registers and their addresses are defined in the table on the next page.

The parallel port also includes a 16-byte FIFO that can be configured for either direction, commanddata FIFO tags (one per byte), a FIFO threshold interrupt for both directions, FIFO empty and full status bits, automatic generation of strobes (by hardware) to fill or empty the FIFO, transfer of commands and data, and a Run Length Encoding (RLE) decompression as explained later in this chapter. Like the data, status and control registers, the FIFO has its own register in the ECP control block, accessed through the base address and an offset. However, since the FIFO can be used in different modes, there are different register names for each type of FIFO access.

The AFIFO, CFIFO, DFIFO and TFIFO registers access the same FIFO. The FIFO is accessed at Base +000h, or Base +400h, depending on the mode field of ECR (bits 7-5) and the direction bit (bit 5) in the DCR. The FIFO can be accessed by Host DMA cycles, as well as Host Port I/O (PIO) cycles.

When DMA is configured and enabled (bit 3 of ECR is 1 and bit 2 of ECR is 0), the ECP automatically (by hardware) issues DMA requests to fill the FIFO (in Host-Forward mode (bit 5 of DCR is 0), or Slave-Reverse mode (bit 5 of DCR is 1)) or to empty the FIFO (in Host-Reverse mode (bit 5 of DCR is 1), or Slave-Forward mode (bit 5 of DCR is 0)). All DMA transfers are to or from these registers. The parallel port stops requesting DMA when Terminal Count (TC) is detected during an ECP DMA cycle.

Writing to a full FIFO, and reading from an empty FIFO, are ignored. The written data is lost, and the read data is undefined. The FIFO Empty and Full status bits are not affected by such accesses.

The parallel port operates in different phases, changing from one phase to another based on the state of the bits in the setup and control registers. All operating modes begin with Compatibility mode. In this mode, the parallel port is in Centronics compatible mode and performs host to printer data transfers. The parallel port starts a negotiation phase from the Compatible mode. The Negotiation phase begins with the host initiating a handshaking sequence with the attached peripheral to determine the highest level of compatibility that can be supported.

After a successful negotiation, the parallel port enters the Setup phase and configures its resources to support the appropriate level. For example, if after setup the parallel port is configured in ECP mode, the parallel port enters the Forward phase and data transfers commence. In the Forward phase, the parallel port may switch from Forward to Reverse allowing bidirectional transfers. A Termination phase ends the ECP mode transfer and the port reverts back to Compatible mode. (This procedure is fully documented in the aforementioned IEEE P1284 Standard.)

Table 1 below identifies the control registers 104 in the bidirectional parallel signal interface 100.

TABLE 1

ECP REGISTERS

| Name | Address | I/O | Size | Mode #ECR (5–7) | Function |
|---|---|---|---|---|---|
| DATAR | Base + 000h | R/W | byte | 000,001 | Port Data Register |
| AFIFO | Base + 000h | W | byte | 011 | ECP Address FIFO |
| DSR | Base + 001h | R | byte | ALL | Device Status Register |
| DCR | Base + 002h | R/W | byte | ALL | Device Control Register |
| CFIFO | Base + 400h | W | byte | 010 | Parallel Port Data FIFO |
| DFIFO | Base + 400h | R/W | byte | 011 | ECP Data FIFO |
| TFIFO | Base + 400h | R/W | byte | 110 | Test FIFO |
| CNFGA | Base + 400h | R/W | byte | 111 | Configuration Register A |
| CNFGB | Base + 401h | R/W | byte | 111 | Configuration Register B |
| ECR | Base + 402h | R/W | byte | ALL | Extended Control Register |
| INDEX | Base + 403h | R/W | byte | ALL | Index Register |
| RAP | Base + 404 | R/W | byte | ALL | Register Access Port |
| ASR | Base + 405 | R/W | byte | ALL | Auxiliary Status Register |

Base address is 278h, 378h or 3BCh

Some registers are not accessible in all modes of operation, or may be accessed in one direction only. Accessing a nonaccessible register has no effect: Data read is undefined, data written is ignored, and the FIFO does not update. Setup functions required for the parallel port are derived from the following discussion: (1) The software must setup the parallel port using the Setup Registers, prior to enabling; (2) After parrallel port setup, the software should enable the parallel port using Setup Register offset 0, bit 0=0; (3) When the parallel port is enabled, and the software wishes to switch modes, it should switch only through Standard Parallel Port or PS/2 modes (ECR bits 7–5=000 or 001); (4) When the parallel port is enabled, the software should change direction only in PS/2 mode, or the Idle-Phase in ECP mode (ECR bits 7–5=001); (5) The software should switch from Parallel Port FIFO mode (ECR bits 7–5=010), or ECP mode (ECR bits 7–5=011), to Standard Parallel Port, or PS/2 mode (000 or 001), only when the FIFO is empty; (6) The user software should switch to ECP mode when bits 0 and 1 of DCR are 0 (The $\overline{ATFD}$ signal and the $\overline{STB}$ signal are controlled by parallel port hardware and software when these bits are set to 0.); (7) The user software should switch to Parallel Port FIFO mode when only bit 0 of DCR is 0 (This puts control of the $\overline{STB}$ signal under the control of the parallel port hardware and software. The Parallel Port FIFO mode is for Forward transfers only.); and (8) The software should disable the parallel port only when in Standard Parallel Port or PS/2 mode.

In Host mode, software may switch from ECP mode Reverse direction to Standard Parallel Port or PS/2 mode when there is an on-going ECP cycle. In this case the read cycle is aborted by deasserting $\overline{ATFD}$. The FIFO is reset (empty) and a potential data decompression (RLE) is automatically terminated since the new mode is Standard Parallel Port or PS/2 mode. This should be done carefully, however, as changing from Reverse ECP transfers to Standard Parallel Port mode may cause contention on the parallel port data lines.

The above-referenced integrated circuit is further described in Appendix C (attached hereto and incorporated herein by reference) in which preliminary specifications for a controller developed by the Assignee and embodying the present invention are described. Those portions of such preliminary specifications which have since been further developed are identified and discussed below.

Throttle (data rate) control (implemented via the DMA max burst size and DRQ de-assertion). In an ISA-based implementation, the ECP mode data transfer rate is more than what the ISA 8-bit DMA can handle. Therefore, without a means of controlling the ECP data rate, the ISA bus would be monopolized by the ECP DMA.

Filtering on ACK and BUSY as well as STB and AFD. When high speed data transfers are taking place in ECP mode, there is an increase in sensitivity to noise and crosstalk in the cable. If the cable is not IEEE1284 compliant, the error rate may reach unacceptable levels.

Level Interrupts: When several source of interrupts are enabled, interrupts can be missed if pulse mode is used. Level mode interrupts are the solution to this problem. In addition, level interrupt support is required in non-PC related applications.

REGISTERS NOT INCLUDED IN THE ISA IMPLEMENTATION STANDARD

1. Index register: The address for this register is: Base address+403.

2. Register Access Port (provides data path for accessing Setup registers): The address for this port is: Base address+404.

3. Setup register index, offset 0: The first register, at index 0, is as follows. Upon reset, GL_IEN is set to 1, all other bits are set to 0.

| FRC_BSY | NEG_MD | REG_LIV | reserved | GL_IEN | ACKF_AFD_IEN | INIT_IEN | reserved |

GL_IEN Global interrupt enable. This bit is used as a qualifier for all other interrupt enable bits. It must be set to 1 in order for interrupts to be generated.

INIT_IEN INIT signal interrupt enable. Used in slave mode only. When set to 1, a falling edge on the INIT signal line generates an interrupt.

ACKF_AFD_IEN ACK/AFD interrupt enable. When set to 1, any transition on the AFD signal line generates an interrupt. Used to support byte/nibble modes.
Host mode: Enable interrupt on ACK falling edge.
Slave mode: Enable interrupt on any edge of AFD.

GL_IEN Global interrupt enable. This bit is used as a qualifier for all other interrupt enable bits. It must be set to 1 in order for interrupts to be generated.

REG_LIV DCR and DSR registers live, called DCR_RG in current specifications. When set to 1, interface output signals are read back live regardless of the mode selected.

NEG_MD Negotiation mode, (used in slave mode only).

FRC_BSY Force BUSY, (used in slave mode only).

4. Setup register index, offset 1: This is the second register, at index 1, and is as follows. Upon reset, all bits are set to 0.

```
| PW_2 | PW_1 | PW_0 | reserved | reserved | HSR_SL | INT_POL | LVL_EDG |
```

LVL_EDG Level/edge interrupt. When set to 0 a pulse interrupt is selected. When level interrupt is selected, bit 2 of ECR is NOT set by hardware when a DMA TC occurs or a FIFO empty/full threshold is reached.

INT_POL Interrupt polarity. When set to 0, a low-going pulse or low level interrupt is selected.

HSR_SL Host/Slave mode select. When set to 0, host mode is selected.

ENABLE When this bit is 0, the 1284 port is disabled. In the present specifications this bit is called DISABLE and has opposite polarity. In the case of a SIO the module power may be turned off when this bit is 0.

N_PWR When this bit is 0, the 1284 port is in low power mode. Compatible or extended mode is enforced (bits 6 and 7 of ECR are forced to 0). ECP and EPP state machine clocks are stopped. Any CPU access to registers will be ignored and terminated regularly, EPP strobe signals will not be generated. ECP interrupts (FAULT falling edge and FIFO/DMA-terminal-count) and EPP timeout interrupt are cleared and masked. ACK rising edge interrupt in host mode or the STB/ rising edge interrupt in slave mode are supported. ACK falling edge interrupt in host mode or AFD rising/ falling edge interrupt may or may not be supported (depending on the complexity). When N_PWR is 0, the interface still works in compatible or extended mode.

EN_OUTS When this bit is 0, the interface signals are tri-state&. In the present specifications this bit is called DIS_OUTS.

F_TOUT_MD FIFO timeout mode. When set to 1, an interrupt is generated when the following conditions are met: this bit is needed for compatibility, since the Microsoft host side specifications do not provide the FIFO timeout feature.
1. Host mode and ECP reverse, or slave mode and ECP or FIFO mode forward.
2. Bits 3 and 2 of ECR are 0 (PIO mode and interrupt enabled).
3. A FIFO timeout has occurred.

6. Register Access Port, index 3:

```
| res | ACK_STB_F2 | ACK_STB_F1 | ACK_STB_F0 | res | BSY_AFD_F2 | BSY_AFD_F1 | BSY_AFD_F0 |
```

PW_2.0 Pulse width. These bits define the pulse width of STB or ACK when FIFO mode is selected.

| Encodings | Pulse Width in Clock Cycles |
|-----------|------------------------------|
| 0 0 0     | 4                            |
| 0 0 1     | 8                            |
| ...       | ..                           |
| 1 1 1     | 32                           |

BSY_STB_F0-2 Filtering on BUSY or STB/.

| Encodings | Number of Clocks |
|-----------|------------------|
| 0 0 0     | 1                |
| 0 0 1     | 2                |
| ...       | .                |
| 1 1 1     | 8                |

5. Setup register index, offset 2: This is the third register, at index 2, and is as follows. The bits in this register are implemented in a global register outside of the 1284 module. This is the case of a SIO including several modules. This is required to simplify the power management task. Upon reset, all bits are set to 0.

```
| reserved | reserved | F_TOUT_MD | res | res | EN_OUTS | N_PWR | ENABLE |
```

ACK__AFD__F0-2 Filtering on ACK or AFD.

| Encodings | Number of Clocks |
|---|---|
| 0 0 0 | 1 |
| 0 0 1 | 2 |
| ... | . |
| 1 1 1 | 8 |

7. Register Access Port, index 4:

```
| res | DRQ2 | DRQ1 | DRQ0 | res | BSZ_2 | BSZ_1 | BSZ_0 |
```

BSZ__0,2 DMA request maximum assertion time. Defines the max number of clocks DRQ can remain asserted after the beginning of the first DMA access.

| Encodings | Number of Clocks |
|---|---|
| 0 0 0 | 0 |
| 0 0 1 | 16 |
| ... | .. |
| 1 1 0 | 96 |
| 1 1 1 | continuous |

DRQ0,1,2 DMA min release time. Specify the number of clock cycles DRQ is kept de-asserted between DRQ assertions. DRQ de-assertion time=8+n * 16 clocks 8. Auxiliary Status Register: The address for this register is: Base address+405. This register is used to acknowledge and clear pending interrupts when level interrupt mode is selected. It can be also used to easily determine the interrupt source(s) for both pulse and level interrupts. The format is as follows. The bits of this register are set whenever the corresponding events occur regardless of the setting of the corresponding interrupt enable bits.

```
| FIFO_TAG | res | F_TOUT_EV | DMA_FIF_EV | ACKR_STBR_EV | ACKF_AFD_EV | INIT_EV/FLT_EV | reserved |
```

INIT_EV/FLT_EV Slave mode: INIT/ signal transition occurred, slave mode only. Set when a falling edge on INIT is detected. Cleared by writing 1 into it.
  Host mode: FAULT/ signal line transitioned from high to low, or bit 4 of ECR changed from 1 to 0 and the FAULT/line was low.
ACKF__AFD__EV ACK/ falling edge or AFD transition occurred. Cleared by writing 1 into it.
  Host mode: Set by the falling edge of ACK/.
  Slave mode: Set by any edge of AFD.
ACKR__STBR__EV ACK/ or STB/ rising edge occurred. Cleared by writing 1 into it.
DMA__FIF__EV DMA TC event occurred or FIFO empty/full event occurred/pending.
  Pulse mode interrupt (ECR bit 2 automatically set to 1): cleared by writing 1 into it.
  Level mode interrupt (ECR bit 2 not set): when DMA mode is selected (ECR bit 3=1), DMA TC interrupt is cleared by writing 1 into this bit position. When PIO mode is selected (ECR bit 3=0), FIFO interrupt can only be cleared by setting bit 2 of ECR or by reading/writing data from/to FIFO.
F__TOUT__EV FIFO timeout occurred during ECP or FIFO mode receive. Cleared when a byte is read from the FIFO.
FIFO__TAG Command bit, ECP mode only. Read-only bit that changes as characters are read. This bit is used to support channel addresses during host as well as slave modes.
  Host mode: BUSY status associated with character at bottom of FIFO during reverse transfer.
  Slave mode: AFD status associated with character at bottom of FIFO during reverse transfer.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451, 319, still pending entitled "DISPLAY CONTROLLER CAPABLE OF ACCESSING AN EXTERNAL MEMORY FOR GRAY SCALE MODULATION DATA"; U.S. patent application Ser. No. 08/451,965, still pending entitled "SERIAL INTERFACE CAPABLE OF OPERATING IN TWO DIFFERENT SERIAL DATA TRANSFER MODES"; U.S. patent application Ser. No. 08/453,076, still pending entitled "HIGH PERFORMANCE MULTIFUNCTION DIRECT MEMORY ACCESS (DMA) CONTROLLER" U.S. patent application Ser. No. 08/452,001, still pending entitled "OPEN DRAIN MULTI-SOURCE CLOCK GENERATOR HAVING MINIMUM PULSE WIDTH"; U.S. patent application Ser. No. 08/451,503, still pending entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION"; U.S. patent application Ser. No. 08/451,924, still pending, entitled "EXECUTION UNIT ARCHITECTURE TO SUPPORT x86 INSTRUCTION SET AND x86 SEGMENTED ADDRESSING", U.S. patent application Ser. No. 08/451,444, still pending, entitled "BARREL SHIFTER"; U.S. patent application Ser. No. 08/451,204, still pending entitled "BIT SEARCHING THROUGH 8, 16, OR 32-BIT OPERANDS USING A 32-BIT DATA PATH"; U.S. patent application Ser. No. 08/451,195, still pending, entitled "DOUBLE PRECISION (64-BIT) SHIFT OPERATIONS USING A 32-BIT DATA PATH" U.S. patent application Ser. No. 08/451,571, still pending entitled "METHOD FOR PERFORMING SIGNED DIVISION"; U.S. patent application Ser. No. 08/452,162, still pending entitled "METHOD FOR PERFORMING ROTATE THROUGH CARRY USING A 32-BIT BARREL SHIFTER AND COUNTER"; U.S. patent application Ser. No. 08/451,434, still pending entitled "AREA AND TIME EFFICIENT FIELD EXTRACTION CIRCUIT"; U.S. patent application Ser. No. 08/451,535, still pending entitled "NON-ARITHMETICAL CIRCULAR BUFFER CELL AVAILABILITY STATUS INDICATOR CIRCUIT"; U.S. patent application Ser. No. 08/445,563, still pending entitled "TAGGED PREFETCH AND INSTRUCTION DECODER FOR VARIABLE LENGTH INSTRUCTION SET AND METHOD OF OPERATION", U.S. patent application Ser. No. 08/450,153, no U.S. Pat. No. 5,546,353 entitled "PARTITIONED DECODER CIRCUIT FOR LOW POWER OPERATION"; U.S. patent application Ser. No. 08/451,495, still pending entitled "CIRCUIT FOR DESIGNATING INSTRUCTION POINTERS FOR USE BY A PROCESSOR DECODER"; U.S. patent application Ser. No. 08/451, 219, still pending entitled "CIRCUIT FOR GENERATING A DEMAND-BASED GATED CLOCK"; U.S. patent application Ser. No. 08/451,214, no U.S. Pat. No. 5,583,453 entitled "INCREMEENTOR/DECREMENTOR"; U.S. patent application Ser. No. 08/451,150, still pending entitled "A PIPELINED MICROPROCESSOR THAT PIPELINES MEMORY REQUESTS TO AN EXTERNAL MEMORY"; U.S. patent application Ser. No. 08/451,198, still pending entitled "CODE BREAKPOINT DECODER"; U.S. patent application Ser. No. 08/445,569, still pending entitled "TWO TIER PREFETCH BUFFER STRUCTURE AND METHOD WITH BYPASS"; U.S. patent application Ser. No. 08/445,564, still pending entitled "INSTRUCTION LIMIT CHECK FOR MICROPROCESSOR"; U.S. patent application Ser. No. 08/452,306, still pending entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE"; U.S. patent application Ser. No. 08/452,080, still pending entitled "APPARATUS AND METHOD FOR EFFICIENT COMPUTATION OF A 486™ MICROPROCESSOR COMPATIBLE POP INSTRUCTION"; U.S. patent application Ser. No. 08/450,154, still pending entitled "APPARATUS AND METHOD FOR EFFICIENTLY DETERMINING ADDRESSES FOR MISALIGNED DATA STORED IN MEMORY"; U.S. patent application Ser. No. 08/451,742, still pending entitled "METHOD OF IMPLEMENTING FAST 486™ MICROPROCESSOR COMPATIBLE STRING OPERATION"; U.S. patent application Ser. No. 08/452,659, still pending entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, still pending entitled "DRAM CONTROLLER THAT REDUCES THE TIME REQUIRED TO PROCESS MEMORY REQUESTS"; U.S. patent application Ser. No. 08/451,420, still pending entitled "INTEGRATED PRIMARY BUS AND SECONDARY BUS CONTROLLER WITH REDUCED PIN COUNT"; U.S. patent application Ser. No. 08/452,365, still pending, entitled "SUPPLY AND INTERFACE CONFIGURABLE INPUT/OUTPUT BUFFER"; U.S. patent application Ser. No. 08/451,744, abandoned entitled "CLOCK GENERATION CIRCUIT FOR A DISPLAY CONTROLLER HAVING A FINE TUNEABLE FRAME RATE"; U.S. patent application Ser. No. 08/451,206, still pending entitled "CONFIGURABLE POWER MANAGEMENT SCHEME"; U.S. patent application Ser. No. 08/452,094, still pending entitled "LIQUID CRYSTAL DISPLAY (LCD) PROTECTION CIRCUIT"; U.S. patent application Ser. No. 08/450,156, still pending entitled "DISPLAY CONTROLLER CAPABLE OF ACCESSING GRAPHICS DATA FROM A SHARED SYSTEM MEMORY"; U.S. patent application Ser. No. 08/450,726, still pending entitled "INTEGRATED CIRCUIT WITH TEST SIGNAL BUSES AND TEST CONTROL CIRCUITS"; U.S. patent application Ser. No. 08/445,568, still pending entitled "DECODE BLOCK TEST METHOD AND APPARATUS".

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a bidirectional parallel signal interface for coupling to and providing a parallel data interface between a computer and a peripheral device external thereto, wherein said computer operates in a plurality of modes including a host mode where data is communicated from said computer to said peripheral device and a slave mode where data is communicated from said peripheral device to said computer, said parallel signal interface comprising:

an interface circuit, including a plurality of registers, for coupling to a computer and communicating thereto and therefrom a plurality of commands and a first plurality of data, wherein said plurality of registers are for receiving, storing and outputting said plurality of commands;

a storage circuit, coupled to said interface circuit via a data communications path, for coupling to a peripheral device and communicating directly thereto and therefrom second and third pluralities of data via said data communications path, for storing said first, second and third pluralities of data, and for communicating said first plurality of data directly to and from said interface circuit via said data communications path;

a host mode controller, coupled to said interface circuit and said storage circuit outside of said data communications path, for receiving a first portion of said plurality of commands outputted by said plurality of registers and in accordance therewith controlling said communication of said second plurality of data from said storage circuit to said peripheral device, and for coupling to said peripheral device and communicating thereto and therefrom a first plurality of control signals; and a slave mode controller, coupled to said interface circuit and said storage circuit outside of said data communications path, for receiving a second portion of said plurality of commands outputted by said plurality of registers and in accordance therewith controlling said communication of said third plurality of data from said peripheral device to said storage circuit, and for coupling to said peripheral device and communicating thereto and therefrom a second plurality of control signals;

wherein said communication of said second and third pluralities of data between said storage circuit and said peripheral device is effected in accordance with a plurality of data communication rates, and wherein said plurality of data communication rates are controlled by said host and slave mode controllers in accordance with said plurality of commands from said plurality of registers.

2. The apparatus of claim 1, wherein said storage circuit comprises a first-in, first-out (FIFO) memory.

3. The apparatus of claim 1, wherein said host mode controller comprises a state machine.

4. The apparatus of claim 1, wherein said slave mode controller comprises a state machine.

5. An apparatus including a bidirectional parallel signal interface for coupling to and providing a parallel data interface between a computer and a peripheral device external thereto, wherein said computer operates in a plurality of modes including a host mode where data is communicated from said computer to said peripheral device and a slave mode where data is communicated from said peripheral device to said computer, said parallel signal interface comprising:

an interface circuit, including a plurality of resisters, for coupling to a computer and communicating thereto and therefrom a plurality of commands and a first plurality of data, wherein said plurality of registers are for receiving, storing and outputting said plurality of commands;

a storage circuit, coupled to said interface circuit via a data communications path, for coupling to a peripheral device and communicating directly thereto and therefrom second and third pluralities of data via said data communications path, for storing said first, second and third pluralities of data, and for communicating said first plurality of data directly to and from said interface circuit via said data communications path;

a host mode controller, coupled to said interface circuit and said storage circuit outside of said data communications path, for receiving a first portion of said plurality of commands outputted by said plurality of registers and in accordance therewith controlling said communication of said second plurality of data from said storage circuit to said peripheral device, and for coupling to said peripheral device and communicating thereto and therefrom a first plurality of control signals; and a slave mode controller, coupled to said interface circuit and said storage circuit outside of said data communications path, for receiving a second portion of said plurality of commands outputted by said plurality of registers and in accordance therewith controlling said communication of said third plurality of data from said peripheral device to said storage circuit, and for coupling to said peripheral device and communicating thereto and therefrom a second plurality of control signals;

wherein said communication of said first plurality of control signals by said host mode controller is responsive to a first portion of said first plurality of control signals and said communication of said second plurality of control signals by said slave mode controller is responsive to a second portion of said second plurality of control signals, and wherein said responsiveness of said host mode controller and said responsiveness of said slave mode controller are controllable in accordance with said first and second portions of said plurality of commands, respectively.

6. The apparatus of claim 5, wherein said storage circuit comprises a first-in, first-out (FIFO) memory.

7. The apparatus of claim 5, wherein in accordance with said first and second portions of said plurality of commands said responsiveness of said host mode controller and said responsiveness of said slave mode controller are delayed by first and second selectable periods of time, respectively.

8. The apparatus of claim 5, wherein said host mode controller comprises a state machine.

9. The apparatus of claim 5, wherein said slave mode controller comprises a state machine.

10. An apparatus including a bidirectional parallel signal interface for coupling to and providing a parallel data interface between a computer and a peripheral device external thereto, wherein said computer operates in a plurality of modes including a host mode where data is communicated from said computer to said peripheral device and a slave mode where data is communicated from said peripheral device to said computer, said parallel signal interface comprising:

an interface circuit, including a plurality of registers, for coupling to a computer and communicating thereto and therefrom a plurality of commands and a first plurality of data, wherein said plurality of registers are for receiving, storing and outputting said plurality of commands;

a storage circuit, coupled to said interface circuit via a data communications path, for coupling to a peripheral device and communicating directly thereto and therefrom second and third pluralities of data via said data communications path, for storing said first, second and third pluralities of data, and for communicating said first plurality of data directly to and from said interface circuit via said data communications path;

a host mode controller, coupled to said interface circuit and said storage circuit outside of said data communications path, for receiving a first portion of said plurality of commands outputted by said plurality of registers and in accordance therewith controlling said communication of said second plurality of data from said storage circuit to said peripheral device, and for coupling to said peripheral device and communicating thereto and therefrom a first plurality of control signals; and a slave mode controller, coupled to said interface circuit and said storage circuit outside of said data communications path, for receiving a second portion of said plurality of commands outputted by said plurality of registers and in accordance therewith controlling said communication of said third plurality of data from said peripheral device to said storage circuit, and for coupling to said peripheral device and communicating thereto and therefrom a second plurality of control signals;

wherein said communication of said second plurality of data from said storage circuit to said peripheral device is halted by said slave mode controller in accordance with said first portion of said plurality of commands.

11. The apparatus of claim 10, wherein said storage circuit comprises a first-in, first-out (FIFO) memory.

12. The apparatus of claim 10, wherein said host mode controller comprises a state machine.

13. The apparatus of claim 10, wherein said slave mode controller comprises a state machine.

* * * * *

UNITED STATES PATENT AND TRADEMARK OFFICE
CERTIFICATE OF CORRECTION

PATENT NO. : 5,710,939
DATED : January 20, 1998
INVENTOR(S) : WILLIAM BALLACHINO ET AL.

It is certified that error appears in the above-identified patent and that said Letters Patent is hereby corrected as shown below:

In Col. 12, line 42, delete "pcriphcral" and replace with --peripheral--.

In Col. 12, lines 66 and 67 delete "com-prIsing" and replace with --comprising--.

In Col. 13 line 1, delete "resisters" and replace with --registers--.

In Col. 14, line 5, delete "communicatcd" and replace with --communicated--.

In Col. 14, line 8, delete "cornpater" and replace with --computer--.

In Col. 14, line 17, delete "circait" and replace with --circuit--.

Signed and Sealed this

Twenty-sixth Day of May, 1998

Attest:

BRUCE LEHMAN

Attesting Officer

Commissioner of Patents and Trademarks